US009156687B2

(12) United States Patent
Wallace et al.

(10) Patent No.: US 9,156,687 B2
(45) Date of Patent: Oct. 13, 2015

(54) WATER REACTIVE HYDROGEN GENERATION SYSTEM AND METHOD WITH SEPARATION OF WASTE PRODUCTS FROM WATER REACTIVE MATERIALS

(75) Inventors: Andrew P. Wallace, Davis, CA (US); John M. Melack, Winters, CA (US); Michael Lefenfeld, New York, NY (US)

(73) Assignee: Intelligent Energy Limited (GB)

( * ) Notice: Subject to any disclaimer, the term of this patent is extended or adjusted under 35 U.S.C. 154(b) by 0 days.

(21) Appl. No.: 13/465,863

(22) Filed: May 7, 2012

(65) Prior Publication Data

US 2012/0282166 A1    Nov. 8, 2012

Related U.S. Application Data

(60) Provisional application No. 61/482,718, filed on May 5, 2011.

(51) Int. Cl.
*C01B 3/06* (2006.01)
*B01J 19/00* (2006.01)
*C01B 3/50* (2006.01)
*B01J 7/02* (2006.01)

(52) U.S. Cl.
CPC ... *C01B 3/06* (2013.01); *B01J 7/02* (2013.01); *C01B 3/065* (2013.01); *C01B 3/501* (2013.01); *Y02E 60/362* (2013.01)

(58) Field of Classification Search
CPC ........................................................ C01B 3/06
See application file for complete search history.

(56) References Cited

U.S. PATENT DOCUMENTS

| 3,133,837 | A | * | 5/1964 | Eidensohn | 429/415 |
| 2001/0030107 | A1 | * | 10/2001 | Simpson | 198/670 |
| 2004/0047801 | A1 | * | 3/2004 | Petillo et al. | 423/657 |
| 2006/0042162 | A1 | * | 3/2006 | Goldstein et al. | 48/61 |

(Continued)

FOREIGN PATENT DOCUMENTS

| WO | WO2005/123586 | * | 12/2005 | C01B 33/06 |
| WO | WO 2007/019172 | * | 2/2007 | |

(Continued)

OTHER PUBLICATIONS

"Val-Matic® Design and Selection Criteria of Check Valves", Val-Matic Valve and Manufacture Corp., ©2011, 26 pages.

*Primary Examiner* — Melvin C Mayes
*Assistant Examiner* — Douglas Call
(74) *Attorney, Agent, or Firm* — Baker Hostetler LLP; Mark H. Krietzman (57) ABSTRACT

A water reactive hydrogen generation system includes devices and methods to combine reactant fuel materials and aqueous solutions to generate hydrogen. The generated hydrogen is used in a fuel cell or other application. The water reactive hydrogen generation system includes a reactant fuel chamber, a reactor chamber (zone), a water solution inlet, a hydrogen output port, and a material delivery device. The material delivery device can include a drive screw and a sliding piston to move the fuel material into the reactor zone when a reaction is initiated. As the reaction takes place, the reaction waste product is removed from the reaction zone to allow additional reactant fuel materials and aqueous solutions to be introduced and to continue the hydrogen-generating reaction. A reaction waste product created is exchanged for additional reactant fuel material at determined intervals to allow the reaction to continue until the reactant fuel is exhausted.

36 Claims, 4 Drawing Sheets

(56) References Cited

U.S. PATENT DOCUMENTS

2007/0020172 A1* 1/2007 Withers-Kirby et al. .. 423/648.1
2007/0237995 A1* 10/2007 Eickhoff et al. ................ 429/19
2009/0119989 A1* 5/2009 Withers-Kirby et al. ......... 48/61

FOREIGN PATENT DOCUMENTS

| WO | WO 2008/014999 | * | 2/2008 | |
| WO | WO 2010/004163 | * | 1/2010 | ................ C01B 3/08 |

* cited by examiner

WATER REACTIVE HYDROGEN GENERATION SYSTEM AND METHOD WITH SEPARATION OF WASTE PRODUCTS FROM WATER REACTIVE MATERIALS

CROSS-REFERENCE TO RELATED APPLICATIONS

This application claims benefit of priority of U.S. Provisional Patent Application Ser. No. 61/482,718 filed on May 5, 2011 the entire disclosure of which is incorporated herein by reference. This application is related to U.S. patent application Ser. No. 11/151,661 filed on Jun. 14, 2005 (now U.S. Pat. No. 7,811,541), U.S. patent application Ser. No. 12/854,510 filed on Aug. 11, 2010, U.S. patent application Ser. No. 13/445,557 filed on Apr. 12, 2012, U.S. patent application Ser. No. 12/750,527 filed on Mar. 30, 2010, and U.S. patent application Ser. No. 13/291,815 filed on Nov. 8, 2011, the disclosures of which are all incorporated herein by reference in their entirety.

TECHNOLOGICAL FIELD

This technology generally relates to water reactive hydrogen-generating systems and methods, and more particularly, to systems and methods for generating hydrogen using alkali metal materials such as sodium silicide, sodium silica gel, chemical hydrides, or multi-component mixtures that are reacted with water or water solutions.

BACKGROUND

Numerous hydrogen production chemistries have been explored for portable systems such as sodium borohydride or methanol reforming, however hydrogen storage commercialization has been limited to high-pressure tanks and metal hydrides—both of which have significant usability issues.

The usability challenges of hydrogen storage and generation has limited the wide-scale adoption of on-board hydrogen production chemistries. Although molecular hydrogen has a very high energy density on a mass basis, as a gas at ambient conditions it has very low energy density by volume. The techniques employed to provide hydrogen to portable and on-board applications are widespread, including high pressure and cryogenics, but they have most often focused on chemical compounds that reliably release hydrogen gas on-demand. Often, the focus has been on three broadly accepted mechanisms used to store hydrogen in materials: absorption, adsorption, and chemical reaction.

In absorptive hydrogen storage for fueling a portable application, hydrogen gas is absorbed directly at high pressure into the bulk of a specific crystalline material, such as a metal hydride or various other frameworks. Most often, metal hydrides, like $MgH_2$, $NaAlH_4$, and $LaNi_5H_6$, are used to store the hydrogen gas reversibly. However, metal hydride systems suffer from poor specific energy (i.e., a low hydrogen storage to metal hydride mass ratio) and poor input/output flow characteristics. The hydrogen flow characteristics are driven by the endothermic properties of metal hydrides (the internal temperature drops when removing hydrogen and rises when recharging with hydrogen). Because of these properties, metal hydrides tend to be heavy and require complicated systems to rapidly charge and/or discharge them. For example, see U.S. Pat. No. 7,271,567 for a system designed to store and then controllably release pressurized hydrogen gas from a cartridge containing a metal hydride or some other hydrogen-based chemical fuel. This system also monitors the level of remaining hydrogen capable of being delivered to the application by measuring the temperature and/or the pressure of the metal hydride fuel itself and/or by measuring the current output of the fuel cell to estimate the amount of hydrogen consumed.

In adsorption hydrogen storage for fueling a portable application, molecular hydrogen is associated with the chemical fuel by either physisorption or chemisorption. Chemical hydrides, like lithium hydride (LiH), lithium aluminum hydride ($LiAlH_4$), lithium borohydride ($LiBH_4$), sodium hydride (NaH), sodium borohydride ($NaBH_4$), and the like, are used to store hydrogen gas non-reversibly. Chemical hydrides produce large amounts of hydrogen gas upon its reaction with water as shown below:

$$NaBH_4 + 2H_2O \rightarrow NaBO_2 + 4H_2$$

To reliably control the reaction of chemical hydrides with water to release hydrogen gas, a catalyst must be employed along with tight control of the water's pH. Also, the chemical hydride is often embodied in a slurry of inert stabilizing liquid to protect the hydride from early release of its hydrogen gas. The chemical hydride systems shown in U.S. Pat. Nos. 7,648,786; 7,393,369; 7,083,657; 7,052,671; 6,939,529; 6,746,496; and 6,821,499, exploit at least one, but often a plurality, of the characteristics mentioned above.

In chemical reaction methods for producing hydrogen for an application, often hydrogen storage and hydrogen release are catalyzed by a modest change in temperature or pressure of the chemical fuel. One example of this chemical system, which is catalyzed by temperature, is hydrogen generation from ammonia-borane by the following reaction:

$$NH_3BH_3 \rightarrow NH_2BH_2 + H_2 \rightarrow NHBH + H_2$$

The first reaction releases 6.1 wt. % hydrogen and occurs at approximately 120° C., while the second reaction releases another 6.5 wt. % hydrogen and occurs at approximately 160° C. These chemical reaction methods do not use water as an initiator to produce hydrogen gas, do not require a tight control of the system pH, and often do not require a separate catalyst material. However, these chemical reaction methods are plagued with system control issues often due to the common occurrence of thermolysis runaway. See, for example, U.S. Pat. No. 7,682,411, for a system designed to thermally initialize hydrogen generation from ammonia-borane and to protect from thermal runaway. See, for example, U.S. Pat. Nos. 7,316,788 and 7,578,992, for chemical reaction methods that employ a catalyst and a solvent to change the thermal hydrogen release conditions.

In view of the above, there is a need for an improved hydrogen generation system and method that overcomes many, or all, of the above problems or disadvantages in the prior art.

SUMMARY

The claimed invention addresses the problems and disadvantages, including system weight and volume, cost, and thermal management of hydrogen generation reactions. The systems and methods of the claimed invention provide a controllable hydrogen generation system based on sodium silicide powder for a variety of applications, including portable and on-board systems.

The claimed invention provides systems and methods for combining water reactive fuel materials with water solutions to generate hydrogen in a controlled and optimized fashion. The reactant fuel materials can include, but are not limited to, stabilized alkali metal materials such as silicides, including sodium silicide powder (NaSi), and sodium-silica gel (Na-SG). The stabilized alkali metal materials can also be combined with other reactive materials, including, but not limited to, ammonia-borane (mixed with or without catalysts), sodium borohydride (mixed with or without catalysts), aluminum (mixed with or without catalysts), and an array of materials and material mixtures that produce hydrogen when exposed to heat, pH change, or aqueous solutions. The mixture of reactant fuel materials and the aqueous solutions can also include additives to control the pH of the waste products, to change the solubility of the waste products, to increase the amount of hydrogen production, to increase the rate of hydrogen production, and to control the temperature of the reaction. The water-reactive materials can include activators, catalysts, or additives to control water dispersion through the reactant fuel material or water absorption of the reaction by-products as well as other materials for stabilizing, controlling, limiting, or modifying the reaction.

The aqueous (water) solutions can include water, salt water, water with catalysts, acids, bases, alcohols, heat transfer fluids, and mixtures of these solutions. Other examples of the aqueous solutions can include methanol, ethanol, hydrochloric acid, acetic acid, sodium hydroxide, and the like. The aqueous solutions can also include additives, such as a coreactant that increases the amount of $H_2$ produced, a flocculant, a corrosion inhibitor, or a thermophysical additive that changes thermophysical properties of the aqueous solution. Example flocculants include calcium hydroxide, sodium silicate, and others, while corrosion inhibitors can include phosphates, borates, and others. Further, the thermophysical additive can change the temperature range of reaction, the pressure range of the reaction, and the like. Further, the additives to the aqueous solution can include mixtures of a variety of different additives.

Additives to the reactant fuel material can also include defoamers, such as oils, as well as similar materials to distribute local reaction sites and/or temperatures in reaction chambers. The additives to the reactant fuel material can also result in more uniform reactivity and heat distribution in the reaction chamber and more control of reaction conditions, including, for example, the chemical and physical nature of the reaction products and by-products. Reactant material size, such as powder size for example, can be controlled to facilitate water transport, reaction rate, and by-product water absorption. Activators, catalysts, or other additives can also be added to the water in order to form a liquid solution at varying conditions.

One example of the reaction equation is:

$$2NaSi_{(s)} + 5H_2O_{(l)} \rightarrow 5H_{2(g)} + Na_2Si_2O_{5(s\ or\ l)}$$

A more general reaction equation for the claimed inventions is:

$$Solid + Liquid \rightarrow Hydrogen\ Gas + By\text{-}product\ (Liquid\ or\ Liquid/Solid)$$

Using the systems and methods of the claimed invention, specific reaction control mechanisms are implemented which encompass water feeding, thermal management, and reaction site maximization.

Controlling the reaction temperature is important for reaction optimization. For some water-reactive mixtures, the reaction rate is a function of the temperature of the reaction. For some reaction by-products, the temperature changes the amount of water absorbed by the reaction by-product, which does not contribute to the hydrogen generation.

To overcome these issues, the system of the claimed invention utilizes water reactive fuels that are fed into a reactor zone, such as a reactor chamber. The reactant fuel can be a powder such as sodium silicide, for example, that is fed into a reactor chamber. A water solution, such as water, salt water, or other water solutions, for example, is also fed into the same reactor chamber. Inside the reactor chamber, the reaction between the sodium silicide and the water solution takes place, hydrogen is separated from the waste product such as sodium silicate, and the hydrogen is output through a separation membrane. The waste product is purged from the reaction chamber. The system and method of the claimed invention allows the continuous or discretized reaction of reactant fuel powder, while having a significantly larger powder reservoir than previous systems. Replenishment of fresh reactant fuel can be performed via a port on a reservoir, or by detaching a reactant fuel chamber (and feed mechanism unit) from the reactor chamber, and switching out the exhausted reactant fuel chamber for a new prefilled chamber.

If refilling is performed by transferring reactant fuel into a fill port hole in ambient air, the reactant fuel can be treated with a desiccant or coated or suspended in a non-reactive fluid so that it does not react with humidity or steam inside the system.

Additionally, other solid forms of the reactant fuels such as sodium silicide, for example, can also be used. Pellets, balls, bricks, pastes, slurries, liquids, chips, flakes, and other similar forms can also be used for the reactant fuel depending upon the reactor chamber, reactant fuel delivery device, application, and end-use of the created hydrogen. The water-reactive materials that make up the reactant fuel can be of different physical shapes and sizes. For example, the material size can be determined by the nature of the reactant fuel material, the manufacturing process of the material, or a post-manufacturing process of the material as well as any combination of these factors. In one example implementation, ranges of material sizes can be used to distribute water, control the reaction rate, and/or control the reaction temperature. The material size and shape can also be formed to facilitate material feeding. For example, material pellets can be formed allowing for more direct transfer of the pellets into the reaction chamber than a powder may provide.

Further, the reactant fuel material can be coated with materials such as a water soluble polymer, or a wax, to facilitate control, storage, and/or reaction dynamics. The coating material can be used to control the reaction rate and/or to control the reaction temperature, for example.

While several example reactor configurations in accordance with the claimed invention depict a reactant fuel material feed and a water solution feed, in other implementations, a third material input, such as a catalyst, can be fed into the reactor separately from the reactant fuel material or water solution. This can provide additional precision with regard to the control of the reaction dynamics. Also, additives to facilitate reaction dynamics such as catalysts for the reactant fuel material, can be premixed into the reactant fuel material and/or into the water solution feed stream, or can be separately stored in the reactor chamber as a catalyst bed and utilized to accelerate on-site of the reactor zone. If a selected catalyst can aid overall reaction, but is potentially reactive during long-term storage with water or dry material, then a separate port for catalyst injection can be incorporated into the reaction chamber. Additionally, different materials can be used in the material feed mechanism to provide drying or to act as a desiccant to isolate the reactant fuel material from water vapor, or the water reactive material itself could act as a desiccant.

In one example implementation, an auger is used to pull powder (or other forms of the reactant fuel material) from a powder chamber and place it into a reactor zone. A motor can be used to spin the auger to control the rate of powder flow into the reactor zone. The powder can have direct contact with the reactor chamber or it can be fed into an intermediate chamber to separate it from the reactor chamber. The powder can be separated from the reactor zone with a partially closed flap, such as a rubber diaphragm with a slit, which allows the powder to be pushed through. It should be appreciated that as the powder (or other forms of the reactant fuel material) passes through the partially closed flap, its presence on passage through will act as a barrier to prevent the water vapor from flowing from the reaction chamber to the reactant fuel material outside the reactor chamber.

In one example, an auger can be connected to a sliding piston through a connected shaft and operated by a single motor. As the piston slides and collapses, this action continually pushes the reactant fuel material and feeds it into the auger assembly. Other systems such as collapsible bellows on the sliding piston can also be used. On the opposite side of the reactant fuel material from the sliding piston, there is an open volume. Either all or some portion of the reaction by-product can be pumped into this volume as the reaction progresses and the reaction by-product (waste) becomes available. Varying the gear ratio and thread pitch of the screw drive controls the movement of the sliding piston, and thus the rate of the increasing volume behind the piston. The rate can be controlled to balance reactant fuel material volume and by-product volume.

In another example, a conveyor belt can be used to transport the reactant fuel material and to place it into the reactor zone. A motor can be used to rotate the conveyor belt to control the rate of reactant fuel material flow into the reactor zone. As before, the reactant fuel material can have direct contact with the reactor chamber or it can be fed into an intermediate chamber to separate it from the reactor chamber. As before, the reactant fuel material can be separated from the reactor chamber with a partially closed flap, such as a rubber diaphragm with a slit that allows powder to be pushed through. It should be appreciated that as the reactant fuel material passes through the partially closed flap, its presence on passage through will act as a barrier to prevent the water vapor from flowing from the reaction chamber to the reactant fuel material outside the reactor chamber.

The following examples are explained using sodium silicide (NaSi), but any water reactive material(s) can be used. In one example, the reactant fuel material can be a powder form of NaSi with the consistency of flour, for example. In another example, the reactant material can be small pellets or balls of NaSi with the consistency of gravel. In another example, the reactant material can contain an array of material sizes including materials that are both the consistency of flour and that of gravel. The sizing of these materials can facilitate the movement through the auger system into the reaction chamber.

In another example, a non-reactive liquid additive can be mixed with the reactant fuel material to enable the reactant fuel to flow as a slurry, a suspension, a colloid, a solution, and the like. One example implementation can use powder NaSi mixed with a non-reactive fluid, like mineral oil, to provide a "flowable" or extrudable form of the reactant fuel material. Depending upon the form of the reactant fuel material and the application in which it is used, a suitable transport device can be used to facilitate placement of the reactant fuel material in the reactor zone.

In addition to augers and conveyor belts, additional transport devices and material handling devices can be used to place the reactant fuel material in the reactor zone. These material handling devices can include moving boxes, escalators, screw conveyors, stackers, reclaimers, bucket elevators, hoppers, diverters, and the like. Depending on application, direction, and system size, various material feed mechanisms and material handling devices can be utilized such as vibrational feeders, traditional hopper dispensers, and the like. In some implementations, gravity can be used to assist the movement of the reactant fuel material, and in other implementations the material delivery mechanisms can be designed to be orientation-independent.

The systems and methods of the claimed invention can also include a sliding piston or a silicate exchange inlet with which to exchange any reaction by-product (waste silicate in the case of NaSi) for new reactant fuel material. For example, as outlined above, the reaction by-product slurry (waste) can be pumped back into an empty volume of a fuel material container made available by the sliding piston. In one example implementation, this can be done to minimize the overall volume of the fuel material container and of the hydrogen generation system itself. In such configurations, the hydrogen generation system further comprising a fuel material container housing the reactant fuel material at the start of the reaction, a combination of the reactant fuel material and the reaction waste product during the reaction, and the reaction waste product at the end of the reaction. In another implementation, pumping the reaction by-product slurry (waste) back into the empty volume of the fuel material container made available by the sliding piston can be done to control the buoyancy shift and/or center of gravity for mobile applications such as in Unmanned Underwater Vehicles.

Regardless of the material handling device employed, the systems and methods of the claimed invention move the reactant fuel material into the reactor zone, where the reactant fuel material is contacted with a water solution. The reaction of the reactant fuel material and water solution generates hydrogen. The reactant fuel material can be moved into the reactor zone continuously or discretely, and the resulting reaction waste product can likewise be removed from the reactor zone continuously or discretely.

In another example configuration, the reactor chamber can be compartmentalized, and its water solution can be delivered via a distribution network to each separate compartment. This configuration spreads the total heat generated from a large scale reaction by segregating portions of the reaction materials. Multiple reactor chambers can also be utilized to facilitate filtration for hydrogen purity using filtration devices, membranes, and the like.

In one example implementation, the reactor zone can have a gas permeable separator membrane to allow hydrogen to be output through it. The incoming water solution (to the reactor chamber) can be sprayed onto the incoming powder and/or onto the membrane to facilitate cleaning as the membrane can become covered in reaction by-product materials (waste). The by-product/water solution slurry can be collected from the reactor zone and removed. The waste slurry (such as sodium silicate) can be ejected from the reactor chamber, pumped out of the reactor chamber, or otherwise purged from the reactor chamber. The waste slurry can be pumped out using a peristaltic pump or the like and/or can be purged by opening a control valve and allowing built up hydrogen pressure inside the reactor chamber to push out the slurry. In one example implementation, a valve can be periodically opened to control the waste slurry flow. In another example configuration, the output slurry can be output to the volume made available by the sliding piston. In another example implementation, the slurry can be output to other available volume(s) in the system, and in another example implementation, the slurry can be output outside the reactor system (such as ejected/dropped from an unmanned air vehicle (UAV) or released from an unmanned underwater vehicle (UUV)). In other example implementations, any of these options can be combined when practical. Of course, other techniques can be used to remove the waste from the reactor chamber to facilitate introduction of additional reactant fuel to be reacted with additional water solution.

Additionally, the reactor can be equipped with a heat sink or other heat removal system. The reaction generates heat, and the heat sink can serve as a primary heat removal point for the hydrogen generation chemical reaction. A thermal control sub-system can be implemented to monitor, control, and/or maintain the heat (temperature) of the sodium silicate waste output to maintain the waste product as a solution or as a slurry to facilitate pumping. For example, if the sodium silicate waste output cools and begins to change state by becoming more solid, it can be more difficult to remove the waste from the reactor chamber. The control system can also use excess water in the reaction zone to maintain the by-product in a slurry state.

The claimed invention can include a removable/replaceable reactant fuel chamber with a supply of reactant fuel, such as 10-50 kg. The reactant fuel chamber is in communication with a material handling device such as a conveyor belt or an auger. The material handling device delivers reactant fuel material to the reactor zone, and water solution is delivered to the reactant fuel material in the reactor zone to initiate the reaction. As the water solution and the reactant fuel material react, hydrogen is produced, which is output from the reactor zone. As hydrogen is produced, a reaction waste product, such as sodium silicate, is also produced. While the material handling device delivers reactant fuel to the reactor chamber, the material handling device removes reaction waste from the reaction zone.

In this fashion, the reaction can continue as additional reactant material is delivered to the reactor chamber to replace the waste material removed. Water can be delivered to the reactor chamber to coincide with the introduction of the new reactant fuel material. The reactant fuel material can be housed in a reactant fuel material chamber before it is moved to the reactor chamber. A water feed mechanism can be constructed to deliver water to the reactor chamber. Each unit can effectively function as a single sub-system as a removable and/or replaceable component. In another example, a fuel material container can be used that includes the reactant fuel material before and during the reaction and includes reaction by-products (waste) during and after the reaction. In another implementation, the water feed mechanism and reactant fuel material chamber can be constructed to effectively function as a single sub-system with the entire sub-system being removable and/or replaceable.

DETAILED DESCRIPTION

Figure 1:
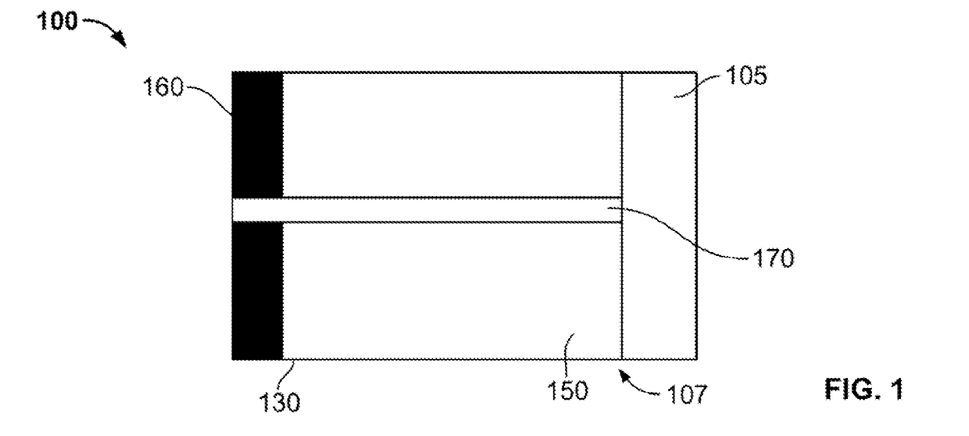
FIG. 1 shows a block diagram of a hydrogen generation system with separable waste product in accordance with the claimed invention.

FIG. 1 shows one example of a water-reactive, hydrogen generation system with separable waste product 100 in accordance with the claimed invention. Reactant fuel 150 is delivered to the reactor zone 105 using material handling devices or transport devices such as augers, conveyor belts, moving boxes, escalators, screw conveyors, stackers, reclaimers, bucket elevators, hoppers, diverters, and the like. For clarity and brevity, in FIG. 1 and FIGS. 4A-4C, a piston 160 is used as the material handling device to move the reactant fuel 150 into the reactor zone 105. The piston can also be used to primarily collapse the volume that contains the water-reactive material while an auger system (or other mechanism) specifically moves the powder from the reactant fuel 150 to the reactor zone 105.

The system 100 includes a reactor zone 105, such as a reactor chamber, a reactant fuel 150, such as a sodium silicide blend, a piston 160, and a drive screw 170 that can be used to drive the piston 160 to deliver the reactant fuel 150 to the reactor zone 105. The drive screw piston 160 can slide within fuel material container 130 and deliver reactant fuel 150 to the reactor zone 105 through reactant fuel inlet 107 (shown in FIG. 3). A motor (not shown) provides power that enables the drive screw 170 to rotate and to move the piston 160, which pushes the reactant fuel 150 toward the reactor zone 105. In FIG. 1, the delivery of the reactant fuel 150 to the reactor zone 105 has not yet commenced.

As outlined above, the reactant fuel 150 can include stabilized alkali metal materials, including powders such as sodium silicide, sodium silica gel, sodium borohydride, sodium silicide/sodium borohydride mixtures, aluminum, and others. Activators, catalysts, and/or additives can be added to the reactant fuel 150 to control water dispersion through the reactant fuel 150 or water absorption of the reaction by-products (waste 190). Additives to the reactant fuel 150 can also include defoamers, such as oils, such as mineral oils, as well as other materials to distribute local reaction temperatures to result in a more uniform heat distribution in the reactor zone 105. The reactant fuel 150 material size can be controlled to facilitate water transport, reaction rate, and by-product water absorption. For example, the powder size of the reactant fuel 150 can be varied from less than 1 mm to 9 mm. In one example implementation, the powder size of the sodium silicide reactant fuel was from approximately 4 mm to 6 mm. This powder size is made large enough to eliminate problematic binding when water or another aqueous solution is added to the reactor zone. Instead of adding water solution to a too-fine powder that is susceptible to binding when wet, this reactant fuel configuration allows for the added water solution 180 to effectively reach fresh powder as the water solution 180 is added to the reactor zone 105.

The reactant fuel 150 can also include stabilized alkali metal materials such as silicides, including sodium silicide powder (NaSi), and sodium-silica gel (Na-SG). The stabilized alkali metal materials can also be combined with other reactive materials, including, for example, ammonia-borane (with or without catalysts), sodium borohydride (mixed with or without catalysts), and an array of materials and material mixtures that produce hydrogen when exposed to heat or aqueous solutions. In one example implementation, the reactant fuel 150 includes stabilized alkali metal materials and such optional coreactants.

Figure 2:
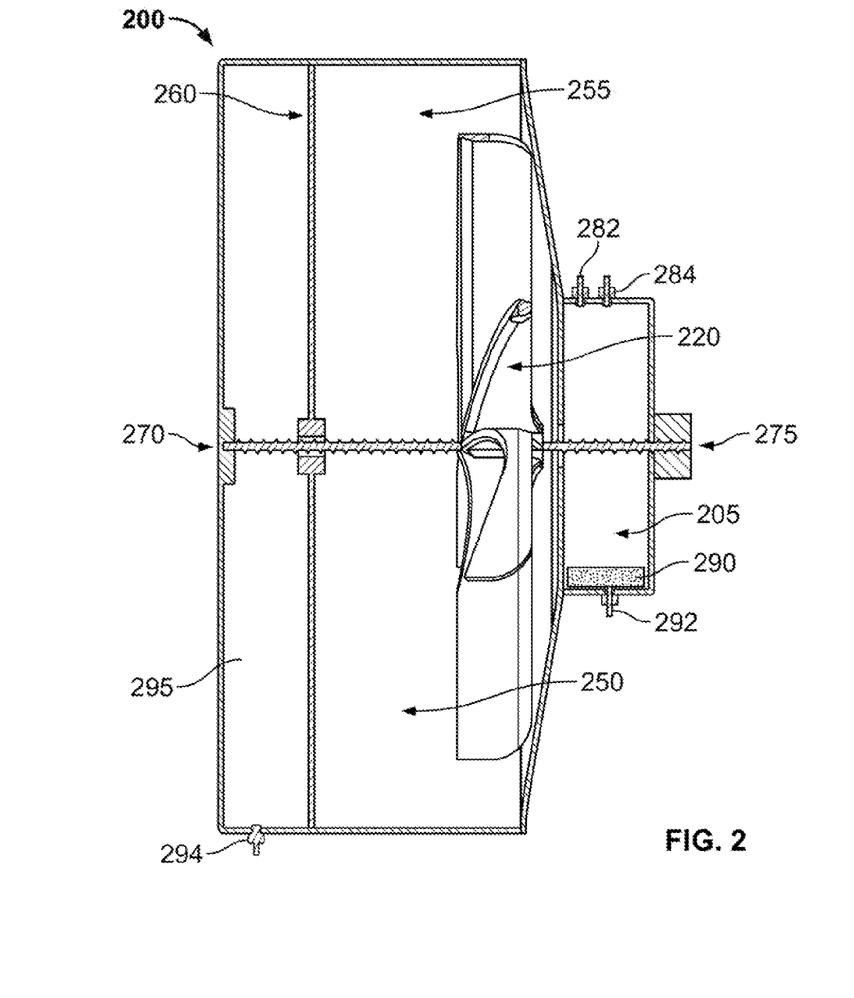
FIG. 2 shows a side view of an example auger implementation of a hydrogen generation system with separable waste product in accordance with the claimed invention.

In one example configuration shown in FIG. 2, the system 200 is configured to use an auger-type of delivery, such that during the rotation of the auger 220, the reactant fuel 250 (powder) translates through the auger 220 from the reactant fuel storage area 255 to the reactor chamber 205. In one implementation, 1 gram of reactant fuel 250 is delivered from the reactant fuel storage area 255 to the reactor chamber 205 via the auger 220 by rotating the auger 220 via a stepper drive motor 275 where 1 gram of reactant fuel 250 leaves the auger 220 and is delivered to the reaction chamber 205 and 1 gram of fresh (unused) reactant fuel 250 enters the auger 220 from the reactant fuel storage area 255. Other types of motors may also be used to deliver fresh reactant fuel from the storage area to the auger while simultaneously delivering fresh reactant fuel to the reactor chamber.

Simultaneously, the stepper drive motor 255 can also turn a drive screw 270 and translate a sliding piston 260 to reduce the volume of the reactant fuel storage area 255 and to facilitate reactant fuel 250 from the volume of the reactant fuel storage area 255 to be picked up by the auger 220. The sliding piston 260 will push the reactant fuel 250 in the direction of the auger 220/reaction chamber 205, and the auger 220 will facilitate smooth delivery of the reactant fuel 250 into the reaction chamber 205. In another example implementation, reactant fuel entrance to the auger can be facilitated by gravity or another compression mechanism or device.

For 1 gram of reactant fuel 250 that is delivered or otherwise enters the reactor chamber 205, approximately 2 grams of water must also be added to fully react the reactant fuel 250. Water will be added to the reactor chamber 205 via a water pump (not shown separately in FIG. 2) or by opening and closing a valve if the water is pre-pressurized. The water can be added to the reactor chamber via water inlet 282. The exact amount of water to be added can be controlled to optimize the reaction conversion by using pressure, temperature, or hydrogen flow rate as feedback mechanisms. Water/reactant fuel interaction can be facilitated by nozzles, tubes, or by mixing elements as outlined below.

Hydrogen gas is generated when water and the reactant fuel are combined. Hydrogen will be allowed to escape the reaction chamber 205 through a gas-permeable membrane (not shown separately in FIG. 2) in the reactor chamber 205, which provides hydrogen via hydrogen output port 284 to a fuel cell system or to another application.

The system 200 will continue to operate based on pressure feedback control. For example, fuel cells typically operate using hydrogen in a range of pressures, such as 3 psi to 7 psi. In one example implementation, the hydrogen pressure in the reactor chamber is allowed to drop until it reaches 4 psi, when additional reactant fuel material (via the auger) and water is added to the reactor chamber, resulting in an increase in hydrogen pressure to 7 psi. As the fuel cell consumes hydrogen, the pressure in the reactor chamber will drop, and the process will repeat. The volume of the reactor chamber, tubing, and fuel cell volume needs to be sized so that the hydrogen generated does not exceed the maximum allowable pressure for the constituent components. In another example configuration, a regulator can be placed in-line between the reactor chamber and the fuel cell or other application. In this example configuration, the pressure of the reactor chamber is cycled over a wider range such as from 15 to 50 psi to facilitate more stable reaction control. In another system implementation, a control system can be used to have the system operate at a near constant pressure.

As the reaction continues, that is, as additional reactant fuel 250 is added to the reactor chamber 205 and water solution is added to the reactor chamber 205 through water inlet 282, a reaction waste product 290 is created along with the hydrogen gas. A waste product output port 292, such as a valve or other suitable mechanism, can be opened to remove the waste product 290 from the reactor chamber 205. An additional collection point or waste chamber can also be used in order to collect the reaction waste product 290 (e.g., sodium silicate) and to separate it from the core point of reaction.

In addition to collecting the reaction waste product 290 in a waste chamber, the reaction waste product 290 can also be returned to the system to minimize packaging requirements and to minimize the number of components used. For example, as the piston 260 slides, this action continually pushes the reactant fuel 250 into the auger 220, which feeds the reactant fuel 250 into the reactor zone 205 to be used in a reaction with the water solution (not shown in FIG. 2) to generate hydrogen. On the opposite side of the sliding piston 260 from the reactant fuel 150, there is an open volume 295. Either all or some portion of the reaction by-product (waste 290) can be pumped into this volume 295 via silicate inlet port 294 as the waste 290 is created during the reaction and otherwise becomes available. Varying the speed, gear ratio, and thread pitch of the screw drive 270 controls the movement of the sliding piston 260 and the auger 220, and thus the rate of the increasing volume of reactant fuel 250 delivered to the reactor zone 205 as well as the rate of the increasing volume of waste 290 produced by the reaction. The rate can be controlled to balance reactant fuel 250 volume to by-product (waste 290) volume.

Returning to FIG. 1, an example water-reactive, hydrogen generation system with separable waste product can be configured without using an auger to deliver the reactant fuel to the reactor chamber (reactor zone). Many of the same (and similar) components used in the auger-type system described above with regard to FIG. 2 are used in the system 100 of FIG. 1 without the auger. For example, in FIG. 1, a motor (not shown) provides power that enables the drive screw 170 to rotate and to move the piston 160, which pushes the reactant fuel 150 toward the reactor zone 105. The drive screw piston 160 can slide within fuel material container 130 and deliver reactant fuel 150 to the reactor zone 105 through reactant fuel inlet 107. In FIG. 1, the state of the system is such that the delivery of the reactant fuel 150 to the reactor zone 105 has not yet begun.

As shown in FIG. 1, the drive screw piston 160 can slide within fuel material container 130 and deliver reactant fuel 150 to the reactor zone 105 through reactant fuel inlet 107. Reactant fuel inlet 107 can be a partially closed flap, such as a rubber diaphragm with a slit, or a permeable membrane, or a collapsible bellows, or a gasket, or the like that allows the reactant fuel to be pushed through and delivered to the reactor zone 105. A motor (not shown) provides power that enables the drive screw 170 to rotate. It should be appreciated that as the fuel material passes through the partially closed flap or a collapsible bellows, or a gasket, or the like, its presence on passage through will act as a barrier to prevent the water vapor from flowing from the reaction chamber to the reactant fuel material outside the reactor chamber.

Figure 4A:
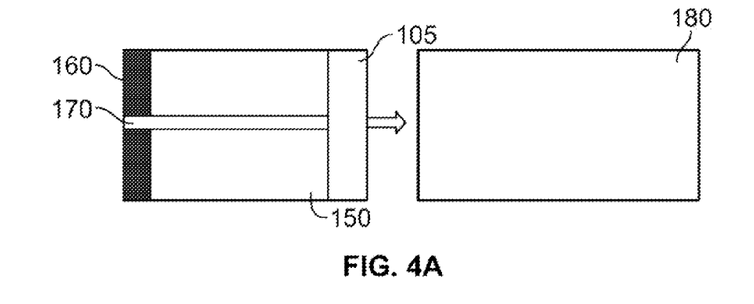
FIGS. 4A-4C show the hydrogen generation system in an "unused" state, a 50% completion state, and an exhausted state as a piston moves reactant fuel into the reactor zone.
Figure 4B:
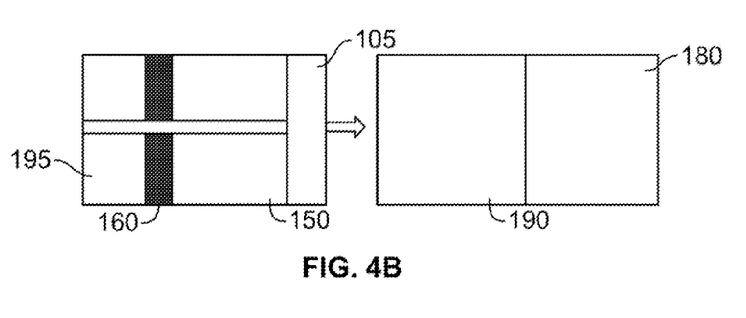
Figure 4C:
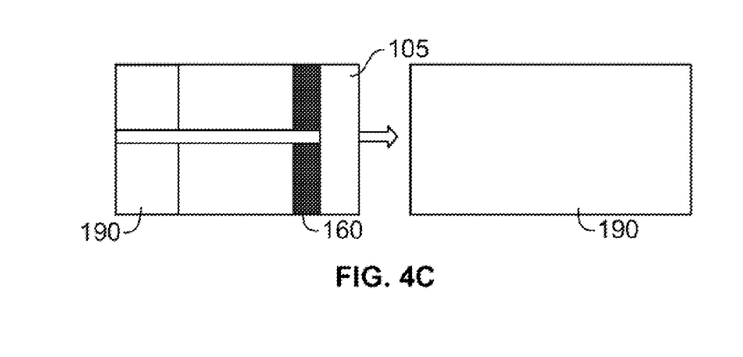

As further shown in FIGS. 4A-4C the drive screw 170 turns and moves the piston 160 which pushes the reactant fuel 150 into the reactor zone 105. The speed and/or rotation of the motor, the speed and/or rotation of the drive screw, the geometry of the drive screw, including channel width, channel depth, flight width, screw diameter, helix angle, root diameter, and the like can be varied to move the piston 160 at a desired and controlled rate of speed. The speed and size of the piston 160 can be varied to deliver a desired and controlled amount of reactant fuel 150 to the reactor zone 105.

FIG. 4A shows the hydrogen generation system 100 of FIG. 1 in an "unused" state where the reactant fuel 150 has not been moved into the reactor zone 105 to be used in a reaction with a water solution 180, such as a peroxide solution, to generate hydrogen. Once the water solution 180 reaches the reactant fuel 150 in the reactor zone 105, hydrogen gas will form generating a pressure inside the reactor zone 105.

FIG. 4B illustrates the hydrogen generation system 100 as the drive screw 170 rotates to drive the piston 160. As the drive screw 170 rotates, it moves piston 160. As the piston 160 slides, this action continually pushes the reactant fuel 150 and feeds it into the reactor zone 105 to be used in a reaction with the water solution 180 to generate hydrogen. As shown in FIGS. 4A-4C, on the opposite side of the reactant fuel 150 from the sliding piston 160, there is an open volume 195. Either all or some portion of the reaction by-product (waste 190) can be pumped into this volume 195 as it becomes available. As outlined above, varying the gear ratio and thread pitch of the screw drive 170 controls the movement of the sliding piston 160, and thus the rate of the increasing volume of reactant fuel 150 delivered to the reactor zone 105 as well as the rate of the increasing volume of waste 190 produced by the reaction. The rate can be controlled to balance reactant fuel 150 volume to by-product (waste 190) volume.

In FIG. 4B, approximately half of the reactant fuel 150 has been used. FIG. 4C shows the hydrogen generation system 100 as the piston 160 reaches the end of its travel and abuts reactant fuel inlet 107 and reactor zone 105. When the piston 160 reaches the end of its travel, all the reactant fuel 150 has been moved into the reactor zone 105 and has been used to react with the water solution 180 to generate hydrogen. The supply of reactant fuel 150 has been exhausted in FIG. 4C.

As shown in FIGS. 4A-4C, as the supply of reactant fuel 150 is delivered to the reaction zone 105 and reacted with the water solution 180, a waste product 190, such as silicate, is generated. As more reactant fuel 150 is reacted with more water solution 180, more waste product 190 is generated. In FIG. 4A, the piston 160 has not begun to move, so no reactant fuel 150 has been moved to the reactor zone 105. As such, the reaction has not started, so no waste product has been generated. In FIG. 4B, the drive screw 170 has moved piston 160 approximately half way through the fuel material container 130, thereby using up approximately half the reactant fuel 150. As such, the reaction between the reactant fuel 150 and the water solution 180 has been approximately 50% completed, and some volume of the water solution 180 and some volume 195 behind the piston 160 has been replaced with waste product 190. In FIG. 4C, the piston 160 has moved all the reactant fuel 150 into the reactor zone 105. The reactant fuel 150 has been exhausted in the reaction, and the volume of waste product 190 has replaced the original volume of the water solution 180 and the volume 195 behind the piston 160. To refill the system 100 with additional reactant fuel 150 and water solution 180, the waste product 190 is removed, and a new supply of fresh reactant fuel and additional water solution is added.

In this fashion, the reaction can continue as additional reactant fuel is delivered to the reactor zone to replace the waste material removed. Water can be delivered to the reactor zone to coincide with the introduction of the new reactant fuel.

Figure 3:
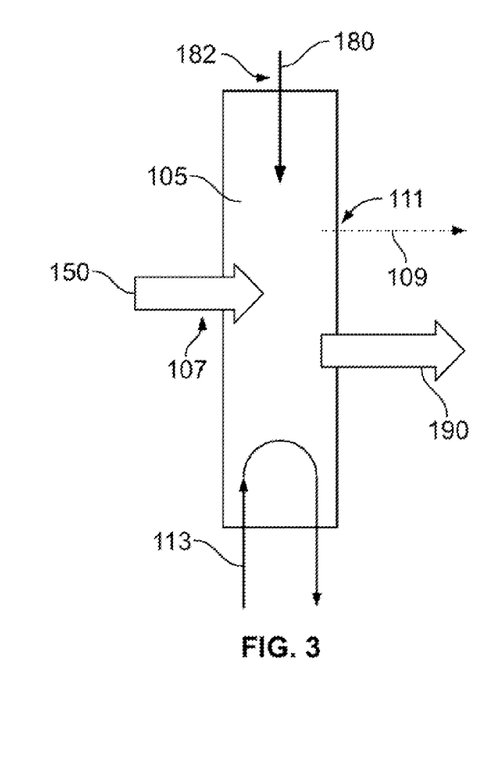
FIG. 3 illustrates a reactor zone in accordance with the claimed invention.

The reactor zones and reactor chambers of the systems shown in FIGS. 1 and 2 include many corresponding and similar components. FIG. 3 depicts a reactor zone as shown in FIG. 1 but, unless otherwise noted, includes components that can also be found in the reactor chamber of FIG. 2. For example, as shown in FIG. 3, reactor zone 105 includes a reactant fuel inlet 107, through which reactant fuel 150 is added. A water solution 180 is added to the reactor zone 105 through water inlet 182. In the reactor zone 105, the water solution 180 reacts with the reactant fuel 150 to generate hydrogen 109. Hydrogen 109 can be let out of the reactor zone 105 in a controlled fashion through a hydrogen outlet 111. For example, the hydrogen outlet 111 can include a valve poppet, check valve, pressure regulator, pressure limiting valve, pressure relief valve, solenoid valve, and the like configured to let out hydrogen gas 109 when pressure in the reactor zone 105 reaches a predetermined level. The generated pressure will supply hydrogen 109 to fuel cells and to other applications while also serving to limit the amount of additional water solution 180 that is input into the reactor zone 105.

In some implementations, the reactor zone 105 can be segmented such that each time the water solution 180 is introduced to the reactor zone 105, the water solution 180 is provided to a different portion of the reactor zone 105, thereby reacting with unspent reactant fuel 150 that resides in that section. The sections can be radially oriented in the case of a cylindrical reactor zone, with dividing walls separating each section, or can be oriented in other configurations with which to separate portions of the reactant fuel.

In one example implementation, the reactor zone 105 can be equipped with a heat sink (not shown separately). Alternatively, as shown in FIG. 3, the reactor zone 105 can include a cooling water path 113 that introduces cooling water (or other coolants, such as antifreeze, seawater, glycols, betaines, oils, refrigerants, and the like) into the reactor zone 105 as a means of absorbing heat from the reactor zone 105. The reaction of the reactant fuel 150 and water solution 180 generates heat, and the cooling water path 113 or heat sink can serve as a convective heat transfer mechanism and as the primary heat removal point for the hydrogen generation chemical reaction. A thermal control sub-system can also be implemented to monitor, control, and/or maintain the heat (temperature) of the sodium silicate waste output 190 in order to maintain it as a solution or slurry to maintain pumping. For example, if the waste output cools and begins to change state by becoming more solid, it can be more difficult to remove the waste from the reactor zone.

In one example implementation, the reactor zone can have a gas permeable separator membrane (not shown in FIG. 3) to allow hydrogen to be output through it. The incoming water solution (to the reactor zone) can be sprayed onto the incoming reactant fuel material and/or onto the membrane to facilitate cleaning as the membrane can become covered in reaction by-product materials (waste). The waste slurry can then be collected in the reactor zone and removed. The slurry (such as sodium silicate) can be ejected from the reactor chamber, pumped out of the reactor chamber, or purged from the reactor chamber. For example, as discussed below with regard to FIG. 5, the waste slurry can be pumped out using a peristaltic pump or the like. Similarly, as discussed below with regard to FIG. 6, the waste slurry can be purged by opening a control valve and allowing built up hydrogen pressure in the reactor zone to push out the waste slurry. In one example implementation, a valve can be periodically opened to control the waste slurry flow. In these example configurations, and as discussed with regard to the FIGURES, the output waste slurry can be output to the volume made available in the fuel material container by the sliding piston. In other example implementations, the slurry can be output to other available volume(s) in the system, and in other example implementations, the slurry can be output outside the reactor system (such as ejected/dropped from an unmanned air vehicle (UAV) or released from an unmanned underwater vehicle (UUV)). Any of these options can be combined when practical. Of course, other techniques can be used to remove the waste from the reactor chamber to facilitate introduction of additional reactant fuel to be reacted with additional water solution to keep the reaction progression as a continuous process until the reactant fuel and/or the water solution is exhausted or until the reaction is stopped by an intervening user.

As shown in FIG. 3, water solution 180 can be delivered to the reactor zone 105 through water inlet 182. Activators, catalysts, or other additives can also be added to the water solution 180 in order to form a liquid solution. The water solution 180 can be delivered to the reactor zone 105 under pressure by way of a bellows assembly, a spring assembly, a piston assembly, and the like (not shown separately in FIG. 3). Alternative methods of holding, pressurizing, and delivering the water solution 180 can also be used. For example, sliding pistons, collapsing diaphragms, inflatable diaphragms, and other deformable containers can be used as well as electrical pumps, such as piezoelectric pumps, and the like. Alternatively, the water solution 180 can be fed to the reactor zone 105 by a gravity feed system as well. Regardless of the amount of pressure under which the water solution 180 is subject, the pressure is used to feed the water solution 180 from a water compartment, water chamber, and the like (not shown separately in FIG. 3) to the reactor zone 105 to begin the reaction. An optional locking mechanism or stop valve or the like can be employed to prevent the water solution 180 from being delivered to the reactor zone 105. Other mechanical, electro-mechanical, or magneto-mechanical devices can also be used to actuate the locking mechanism or valve and to prevent water from traveling from the water solution source into the reactor zone.

To distribute the water solution 180 to the reactant fuel 150, reaction feed tubes can be connected to the water inlet 182 to distribute water solution 180 throughout the reactor zone 105. In one example implementation, silicone is used as the reaction feed tube (not shown separately), and small holes are used for water solution dispersion. Small holes in rigid tubing may have a tendency to clog due to the by-products of the reaction in the reactor zone 105. The holes can be precision-drilled, molded, or precision punched. In one example implementation, the holes in the silicone reaction feed tube will self-enlarge around blockages due to the flexibility of the tubing.

In one example implementation, additional fittings can be used to connect a reaction feed tube to the water inlet 182. For example, T-fittings allow for rapid hand-assembly of the reaction feed tube and allow customization of the reaction feed tube and the delivery of the water solution to the reactant fuel. Similar silicone (or other flexible) tubing employing a T-fitting can utilize a hole or a series of holes to control the uniformity, speed, and amount of water solution distributed by the reaction feed tube to the reactant fuel. For example, holes can be fabricated in a wide range of different sizes and locations. T-fittings allow for the use of silicone or other flexible tubing without custom molding. T-fittings also allow for the tubing to stay in a controlled area. With a T-fitting or other manner of delivering the water solution directly to the reactant fuel material, as opposed to a location in the reactor zone, the water solution required is minimized. Additionally, the direct delivery of the water solution to the reactant fuel eliminates pooling in areas near the reactor zone walls. T-fittings allow for the tubing to be kept off the wall without the need of glue, other mechanical supports, or custom molded components and provides a uniform distribution of water to the reactant fuel.

In use, water solution 180 flows from a water source through water inlet 182 and enters the reactor zone 105. The water solution 180 is distributed to the reactant fuel present in that section of the reactor zone 105, and hydrogen is created.

Figure 5:
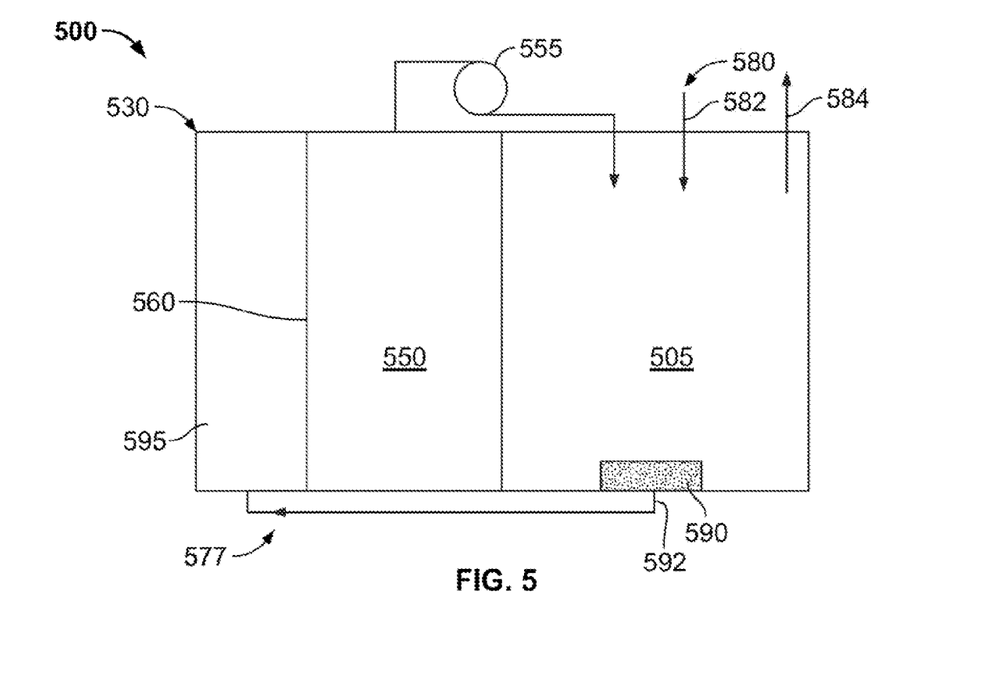
FIG. 5 illustrates an example pump-based implementation of a hydrogen generation system with separable waste product.

In addition to using solid or powder reactant fuel materials, the underlying compositions can be mixed with non-reactive liquid additives to enable the reactant fuel to flow as a slurry, a suspension, a colloid, a solution, and the like. As shown in FIG. 5, one example implementation can use powder NaSi mixed with mineral oil to provide a "flowable" or liquid form of the reactant fuel material. In using a flowable or liquid form of the reactant fuel material, a suitable material transport device can be used to facilitate placement of the reactant fuel material in the reactor zone.

FIG. 5 shows an example water-reactive, hydrogen generation system 500 with separable waste product in accordance with the claimed invention that utilizes a liquid or flowable reactant fuel. Liquid reactant fuel 550 is delivered to the reactor zone 505 using a flexible divider or sliding piston 560 to move the liquid reactant fuel 550 into the reactor zone 505.

The system 500 includes a reactor zone 505, such as a reactor chamber, a liquid reactant fuel 550, such as a liquid sodium silicide blend, and a sliding piston 560. A peristaltic pump 555 is used to pump the liquid reactant fuel 550 into the reactor zone 505. Of course, the peristaltic pump could be used to pump other forms of the reactant fuel, such as powders, slurries, and the like into the reactor zone as well. As the peristaltic pump 555 moves the liquid reactant fuel into the reactor zone, water 580 is moved into the reactor zone 505 using water inlet 582. The water 580 and reactant fuel 550 react, and hydrogen gas is created. The hydrogen gas is allowed to escape the reaction zone 505 through an optional gas-permeable membrane (not shown separately in FIG. 5) in the reactor zone 505, which provides hydrogen via hydrogen output port 584 to a fuel cell system or to another application.

As the reaction continues, that is, as additional liquid reactant fuel 550 is added to the reactor zone 505 and water solution 580 is added to the reactor zone 505 through water inlet 582, a reaction waste product 590 is created along with the hydrogen gas. A waste product output port 592, such as a valve or other suitable mechanism, can be opened to remove the waste product 590 from the reactor zone 505. The waste product 590 is then moved from the reactor zone 505 through check valve 577 to the open volume 595 on the opposite side of the reactant fuel 550 from the sliding piston 560. Either all or some portion of the reaction by-product (waste 590) can be exchanged into this volume 595 as the reaction continues and the waste product is created. Varying the speed and the volume of reactant fuel 595 moved by the peristaltic pump 555 controls the amount of liquid reactant fuel 550 delivered to the reactor zone 505 to be reacted with additional water solution as well as the rate of the increasing volume of waste 590 produced by the reaction. The rate can be controlled to balance reactant fuel 550 volume used to by-product (waste 190) volume created. As before, an additional collection point or waste chamber can also be used in order to collect the reaction waste product 590 (e.g., sodium silicate) and to separate it from the core point of the reaction.

The reaction by-product slurry (waste) can be pumped back into the empty volume made available by the sliding piston to minimize overall volume of the container 530. In another implementation, this can be done to control the buoyancy shift and/or center of gravity for mobile applications such as Unmanned Underwater Vehicles.

Figure 6:
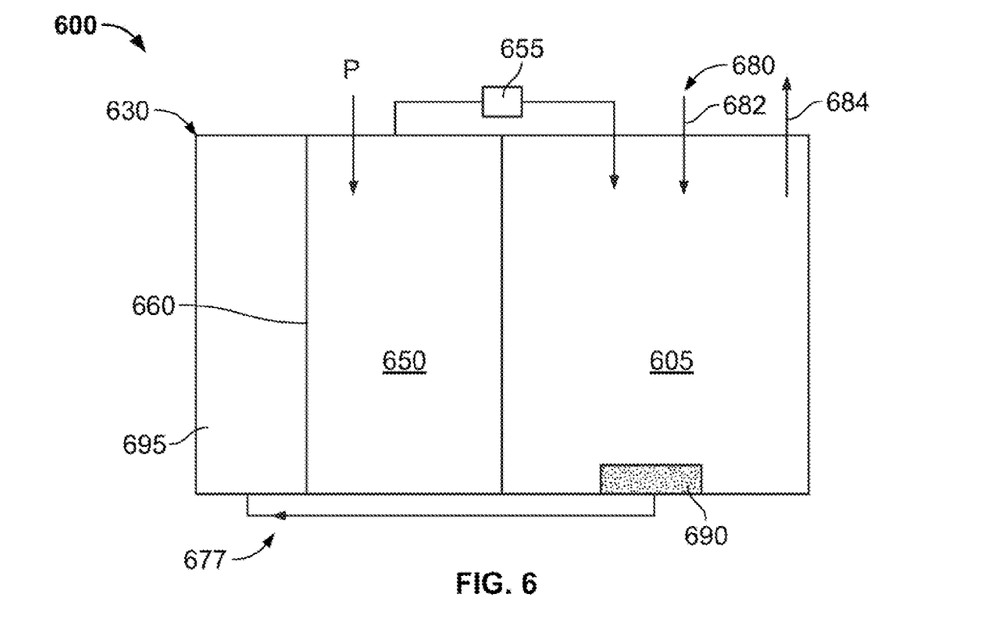
FIG. 6 illustrates an example valve-based implementation of a hydrogen generation system with separable waste product.

FIG. 6 shows a similar valve-based water-reactive, hydrogen generation system 600 with separable waste product. In system 600, a liquid reactant fuel is pressurized and then injected into the reactor zone using a pinch valve or other similar valve. Liquid reactant fuel 650 is delivered to the reactor zone 605 using a flexible divider or sliding piston 660 to move the liquid reactant fuel 650 into the reactor zone 605.

The system 600 includes a reactor zone 605, such as a reactor chamber, a liquid reactant fuel 650, such as a liquid sodium silicide blend, and a sliding piston 660. The liquid reactant fuel 650 is pressurized by a pressure-inducing force P that acts upon the liquid reactant fuel 650. A pinch valve 655 is used to move the liquid reactant fuel 650 under pressure into the reactor zone 605. Of course, the pinch valve could be used to move other forms of the reactant fuel, such as slurries and the like into the reactor zone as well. As the pinch valve 655 moves the liquid reactant fuel 650 into the reactor zone 605, a water solution 680 is moved into the reactor zone 605 using water inlet 682. The water solution 680 and reactant fuel 650 react, and hydrogen gas is created. The hydrogen gas is allowed to escape the reaction zone 605 through an optional gas-permeable membrane (not shown separately in FIG. 6) in the reactor zone 605, which provides hydrogen via hydrogen output port 684 to a fuel cell system or to another application.

As the reaction continues, that is, as additional liquid reactant fuel 650 is added to the reactor zone 605 and water solution 680 is added to the reactor zone 605 through water inlet 682, a reaction waste product 690 is created along with the hydrogen gas. A waste product output port 692, such as a valve or other suitable mechanism, can be opened to remove the waste product 690 from the reactor zone 605. The waste product 690 is then moved from the reactor zone 605 through check valve 677 to the open volume 695 on the opposite side of the reactant fuel 650 from the sliding piston 660. Either all or some portion of the reaction by-product (waste 690) can be exchanged into this volume 695 as the reaction continues and the waste product 690 is created. Varying the pressure and the volume of reactant fuel 695 moved by the pinch valve 655 controls the amount of liquid reactant fuel 650 delivered to the reactor zone 505 to be reacted with additional water solution as well as the rate of the increasing volume of waste 690 produced by the reaction. The rate can be controlled to balance reactant fuel 650 volume used to by-product (waste 690) volume created. As before, an additional collection point or waste chamber can also be used in order to collect the reaction waste product 690 (e.g., sodium silicate) and to separate it from the core point of the reaction.

The reaction by-product slurry (waste) can be pumped back into the empty volume made available by the sliding piston to minimize overall volume of the container 630. In another implementation, this can be done to control the buoyancy shift and/or center of gravity for mobile applications such as Unmanned Underwater Vehicles.

Figure 7:
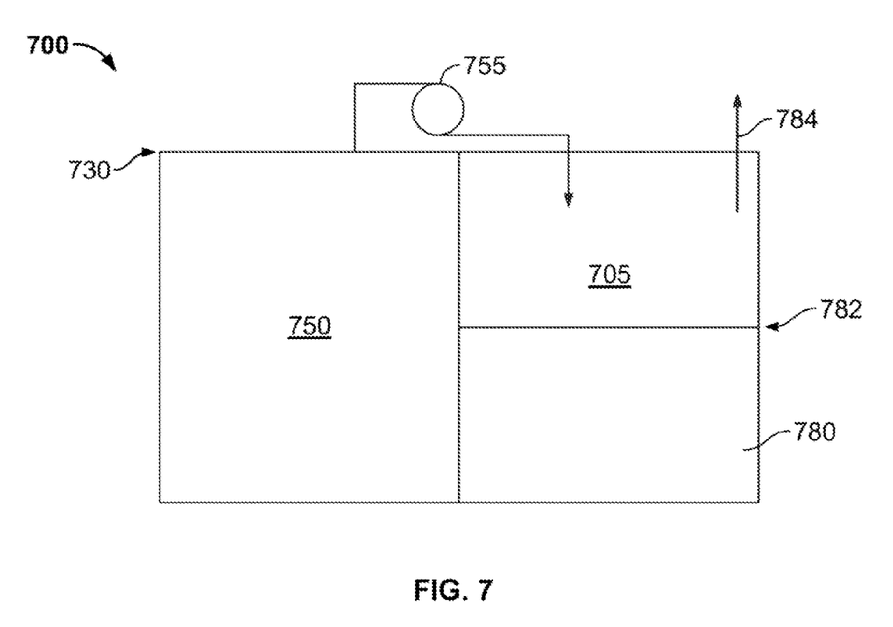
FIG. 7 illustrates an example pre-filled liquid fuel material container in communication with a reactor zone.

The container in these examples can be modified and pre-filled with reactant fuel and/or water solution for the reaction. For example, as shown in FIG. 7, a variation of the pump-based reaction system of FIG. 5 can include separate chambers for the reactor zone 705, the water solution 780, and the liquid reactant fuel 750 that are all housed within a single container 730. Peristaltic pump 755 can also be housed within the same container 730 or can be mounted externally. In FIG. 7, peristaltic pump 755 is shown outside the container 730 for visualization purposes only.

As was the case with the pump-based system of FIG. 5, the pre-filled system 700 can utilize peristaltic pump 755 to pump the liquid reactant fuel 750 into the reactor zone 705. As the peristaltic pump 755 moves the liquid reactant fuel into the reactor zone, water solution 780 is moved into the reactor zone 705 through water inlet 782. The water solution 780 and reactant fuel 750 react, and hydrogen gas is created. The hydrogen gas is allowed to escape the reaction zone 705 through an optional gas-permeable membrane (not shown separately in FIG. 7) in the reactor zone 705, which provides hydrogen via hydrogen output port 784 to a fuel cell system or to another application.

As was the case above, as the reaction continues and additional liquid reactant fuel 750 is added to the reactor zone 705 and water solution 780 is added to the reactor zone 705 through water inlet 782, a reaction waste product (not shown separately in FIG. 7) is created along with the hydrogen gas. A waste product output port (not shown separately in FIG. 7) can be opened to remove the waste product from the reactor zone 705. The waste product can be then moved from the reactor zone 705 through a check valve to an open volume (not shown separately in FIG. 7) in container 730. Either all or some portion of the reaction by-product (waste) can be exchanged into this volume as the reaction continues and the waste product is created. Varying the speed and the volume of reactant fuel 795 moved by the peristaltic pump 755 controls the amount of liquid reactant fuel 750 delivered to the reactor zone 705 to be reacted with additional water solution 780 as well as the rate of the increasing volume of waste 790 produced by the reaction. The rate can be controlled to balance reactant fuel 750 volume used to by-product (waste) volume created. As before, an additional collection point or waste chamber can also be used in order to collect the reaction waste product (e.g., sodium silicate) and to separate it from the core point of the reaction.

In other example configurations, the reactor zone can be compartmentalized, and the water solution can be delivered via a distribution network to each separate compartment. This spreads the total heat generated from a large scale reaction by segregating portions of the reaction materials. Multiple reactor zones can also be utilized to facilitate filtration for hydrogen purity using filtration devices, membranes, and the like.

Regardless of the material handling device employed and the type of reaction zone employed, the system and method of the claimed invention moves the reactant fuel material into the reactor zone where the reactant fuel material is contacted with a water solution. The reaction of the reactant fuel and water solution generates hydrogen. The reactant fuel can be moved into the reactor chamber continuously or discretely, the water solution can be applied to the reactant fuel continuously or discretely, and the resulting reaction waste product is likewise removed from the reactor zone continuously or discretely to maintain a constant reaction.

Having thus described the basic concept of the invention, it will be rather apparent to those skilled in the art that the foregoing detailed disclosure is intended to be presented by way of example only, and is not limiting. In addition to the embodiments and implementations described above, the invention also relates to the individual components and methods, as well as various combinations and subcombinations within them. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as can be specified in the claims.

The claimed invention is:

1. A hydrogen generation system comprising:
   a solid reactant fuel material, comprising a stabilized alkali metal;
   a reactor chamber;
   a solid reactant fuel material handling device that feeds the solid reactant fuel material from a powder chamber directly into the reactor chamber;
   a slitted or flapped diaphragm positioned between the powder chamber and the reactor chamber and configured to allow reactant fuel material to enter the reactor chamber while not allowing water vapor to flow from the reactor chamber to the reactant fuel material outside the reactor chamber;
   a water solution inlet operably connected to the reactor chamber and configured to provide a water solution directly to the reactor chamber to react with the reactant fuel material to generate hydrogen; and
   a reaction waste product removal device that removes from the reactor chamber a reaction waste product created by the reaction of the solid reactant fuel and the water solution,
   wherein said hydrogen generation system only contains a single said reactor chamber.

2. The hydrogen generation system of claim 1, wherein the solid stabilized alkali metal includes sodium silicide or sodium silica gel, and optionally a coreactant.

3. The hydrogen generation system of claim 1, wherein the solid reactant fuel material includes sodium borohydride, and optionally a coreactant.

4. The hydrogen generation system of claim 1, wherein the water solution includes a catalyst.

5. The hydrogen generation system of claim 1, wherein the solid reactant fuel material is at least one of a pellet, ball, brick, paste, chip, or flake.

6. The hydrogen generation system of claim 5, wherein the solid reactant fuel material handling device is configured to receive the solid reactant fuel material in the form of at least one of a pellet, ball, brick, paste, chip, or flake to facilitate reactant material movement to the reactor chamber.

7. The hydrogen generation system of claim 1, wherein the reaction waste product includes sodium silicate.

8. The hydrogen generation system of claim 1, wherein the solid reactant fuel material comprises a water soluble polymer coating.

9. The hydrogen generation system of claim 1, wherein the solid reactant fuel material handling device is operably connected to the reactor chamber to replenish the solid reactant fuel material in the reactor chamber as the reaction progresses.

10. The hydrogen generation system of claim 9, wherein the solid reactant fuel material handling device and the reaction waste product removal device are synchronized to deliver a volume of solid reactant fuel material to the reactor chamber and remove a volume of reaction waste product from the reactor chamber.

11. The hydrogen generation system of claim 1, wherein the water solution inlet is operably connected to the reactor chamber to replenish the water solution in the reactor chamber as the reaction progresses.

12. The hydrogen generation system of claim 1, wherein the solid reactant fuel material being fed into the reaction chamber prevents water vapor from flowing from the reactor chamber to the solid reactant fuel material outside the reactor chamber.

13. The hydrogen generation system of claim 1 further comprising:
   a separator membrane in the reactor chamber that separates hydrogen from the solid reactant fuel material, water solution, and reaction waste product.

14. The hydrogen generation system of claim 13, wherein the separator membrane is positioned in the reactor chamber and the water solution is sprayed onto the separator membrane to clean the membrane during the reaction.

15. The hydrogen generation system of claim 1, wherein the solid reactant fuel material handling device includes at least one of a sliding piston and an auger.

16. The hydrogen generation system of claim 1 further comprising:
   a fuel material container housing the solid reactant fuel material at the start of the reaction, a combination of the solid reactant fuel material and the reaction waste product during the reaction, and the reaction waste product at the end of the reaction.

17. The hydrogen generation system of claim 1, wherein the solid reactant fuel, solid reactant fuel material handling device, and reaction waste product removal device are configured to provide a continuous delivery of solid reactant fuel to the reaction chamber and a continuous removal of reaction waste product from the reactor chamber.

18. The hydrogen generation system of claim 1, where the solid reactant fuel material handling device comprises an auger, conveyor belt, moving box, screw conveyor, bucket elevator, hopper, vibrational feeder, hopper dispensers, or a combination thereof.

19. A method of generating hydrogen and removing a reaction waste product using the hydrogen generating system of claim 1 comprising:
   feeding the solid reactant fuel material to the reaction chamber; and
   feeding the water solution to the reaction chamber.

20. The method of claim 19, wherein the solid stabilized alkali metal includes sodium silicide or sodium silica gel, and optionally a coreactant.

21. The method of claim 19, wherein the solid reactant fuel material includes sodium borohydride, and optionally a coreactant.

22. The method of claim 21, wherein the water solution includes a catalyst.

23. The method of claim 19, wherein the solid reactant fuel material is at least one of a pellet, ball, brick, paste, chip, or flake.

24. The method of claim 23, wherein feeding the solid reactant fuel material to the reactor chamber includes the solid reactant fuel material handling device receiving the solid reactant fuel material in the form of at least one of a pellet, ball, brick, paste, chip, and flake to facilitate reactant material movement to the reactor zone.

25. The method of claim 24 further comprising:
   regulating pressure of the reaction waste product with a valve as the reaction waste product is moved to the fuel material container.

26. The method of claim 19, wherein removing the reaction waste product includes removing sodium silicate.

27. The method of claim 19, wherein the solid reactant fuel material comprises a water soluble polymer coating.

28. The method of claim 19, wherein feeding the solid reactant fuel material to the reactor chamber includes replenishing the solid reactant fuel material in the reactor zone as the reaction progresses.

29. The method of claim 28 further comprising:
synchronizing delivery of a volume of solid reactant fuel material to the reactor chamber and removing a volume of reaction waste product from the reactor chamber.

30. The method of claim 19 further comprising:
replenishing the water solution in the reactor chamber as the reaction progresses.

31. The method of claim 19 further comprising:
preventing water vapor from flowing from the reactor chamber to the solid reactant fuel material outside the reactor zone.

32. The method of claim 19 further comprising:
separating hydrogen from the solid reactant fuel material, water solution, and reaction waste product with a separator membrane.

33. The method of claim 19 further comprising:
passing the hydrogen through the water solution to provide at least one of filtration of chemicals or particles, condensation of water vapor, and reduction of hydrogen stream temperature.

34. The method of claim 19, wherein feeding the solid reactant fuel material to a reactor chamber includes moving the solid reactant fuel material into the reactor chamber with at least one of a sliding piston and an auger.

35. The method of claim 19 further comprising:

housing the solid reactant fuel material in a fuel material container at the start of the reaction; housing a combination of the solid reactant fuel material and the reaction waste product in the fuel material container during the reaction; and housing the reaction waste product in the fuel material container at the end of the reaction.

36. The method of claim 19 further comprising:

continuously delivering solid reactant fuel to the reaction zone; and continuously removing solid reaction waste product from the reaction zone.

\* \* \* \* \*